US012311503B2

(12) United States Patent
Wern

(10) Patent No.: US 12,311,503 B2
(45) Date of Patent: May 27, 2025

(54) PART PROCESSING AND CLEANING APPARATUS AND METHOD OF SAME

(71) Applicant: ENGINEERED ABRASIVES, INC., Alsip, IL (US)

(72) Inventor: Michael J. Wern, Alsip, IL (US)

(73) Assignee: ENGINEERED ABRASIVES, INC., Alsip, IL (US)

( * ) Notice: Subject to any disclaimer, the term of this patent is extended or adjusted under 35 U.S.C. 154(b) by 1291 days.

(21) Appl. No.: 17/020,137

(22) Filed: Sep. 14, 2020

(65) Prior Publication Data

US 2020/0406423 A1 Dec. 31, 2020

Related U.S. Application Data

(63) Continuation of application No. 15/945,960, filed on Apr. 5, 2018, now Pat. No. 10,773,358, which is a (Continued)

(51) Int. Cl.

*B24C 1/10* (2006.01)
*B08B 3/12* (2006.01)

(Continued)

(52) U.S. Cl.

CPC ................ *B24C 1/10* (2013.01); *B08B 3/123* (2013.01); *B24C 3/26* (2013.01); *B24C 9/00* (2013.01); *B08B 3/12* (2013.01)

(58) Field of Classification Search

CPC .... B24C 1/10; B24C 3/26; B24C 9/00; B08B 3/123; B08B 3/12; B08B 3/04;

(Continued)

(56) References Cited

U.S. PATENT DOCUMENTS 5,501,240 A * 3/1996 Dohku ...................... B08B 3/02 134/102.2
6,016,821 A * 1/2000 Puskas .................. B06B 1/0618 134/186

(Continued)

*Primary Examiner* — Robert F Neibaur
(74) *Attorney, Agent, or Firm* — BakerHostetler

(57) ABSTRACT

A part processing apparatus and method is disclosed that includes a media-blasting apparatus and a cleaning apparatus. The media-blasting apparatus is configured to blast a stream of media against a surface of a part, and the cleaning apparatus is configured to clean debris or particles from the surface of the part. The cleaning apparatus includes a first spray-and-wash unit, a first ultrasonic wash unit, a second ultrasonic wash unit, and a second spray-and-wash unit, which may be arranged in the listed order. Each of the units may be configured to utilize hot liquid or water to clean the part being processed. The first ultrasonic wash unit is configured to ultrasonically vibrate a liquid in the first ultrasonic wash unit at a first frequency, and the second ultrasonic wash unit is configured to ultrasonically vibrate a liquid in the second ultrasonic wash unit at a second frequency. The first and second frequencies may be different from each other, such that vibration at the second frequency causes additional debris or particles to be removed from the surface of the part that were not, or could not be, removed from exposure to vibration at the first frequency. The apparatus and method may further include a drying and/or inspection unit for the part after being processed in the cleaning apparatus.

4 Claims, 7 Drawing Sheets

Related U.S. Application Data continuation of application No. 15/337,133, filed on Oct. 28, 2016, now Pat. No. 10,076,822.

(60) Provisional application No. 62/254,051, filed on Nov. 11, 2015.

(51) Int. Cl.
*B24C 3/26* (2006.01)
*B24C 9/00* (2006.01)

(58) Field of Classification Search
CPC ........... B08B 3/044; B08B 7/028; B08B 7/02; B24B 1/04; B24B 27/033; B24B 31/06
USPC ....... 451/36, 75, 38, 113; 72/53; 134/1, 95.3
See application file for complete search history.

(56) References Cited

U.S. PATENT DOCUMENTS 8,453,305 B2 * 6/2013 Wern .................... B24B 31/073 451/36
8,777,695 B2 * 7/2014 Sato .................. H01L 21/67057 451/910

* cited by examiner

FIG. 3
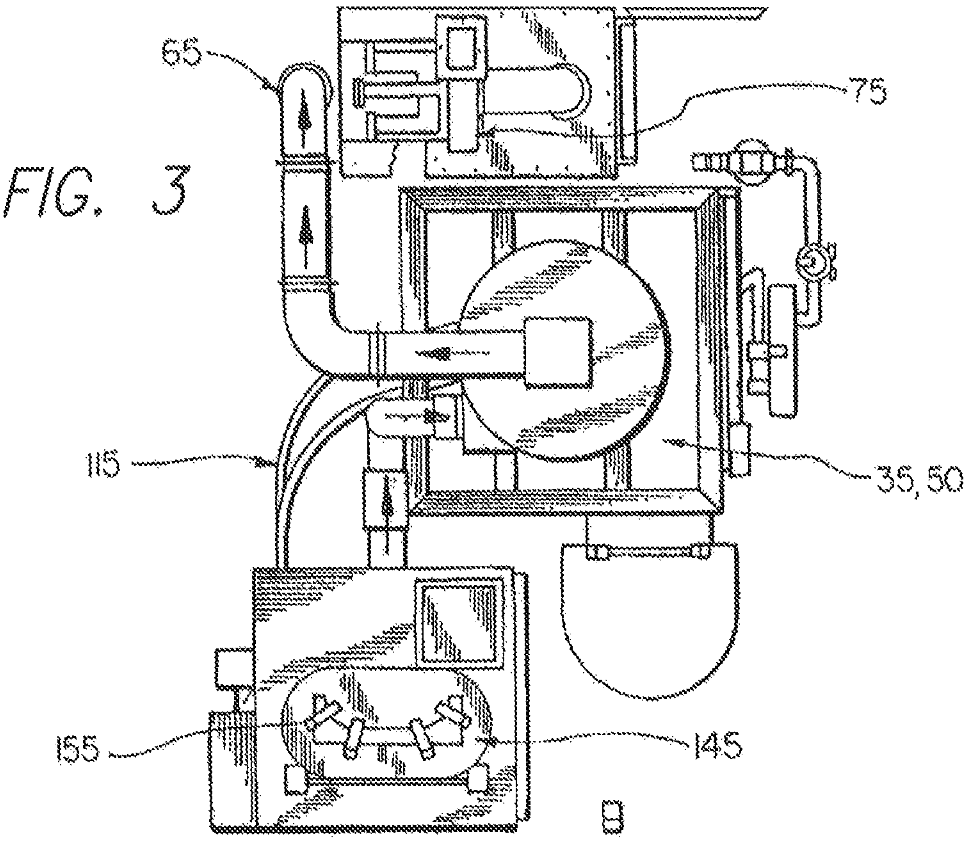
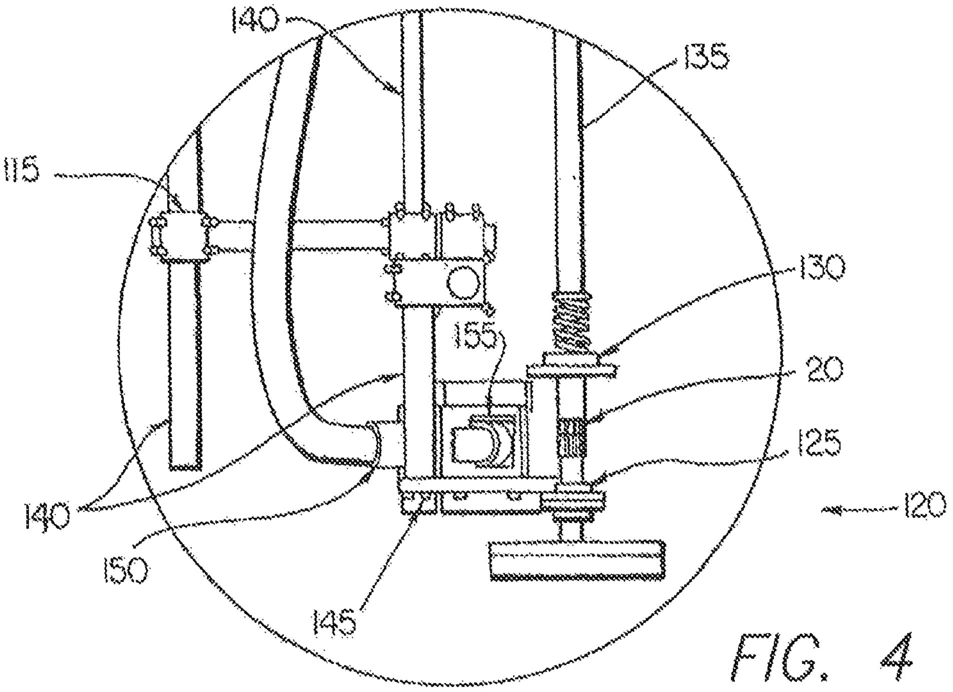
FIG. 4

PART PROCESSING AND CLEANING APPARATUS AND METHOD OF SAME

CROSS REFERENCE TO RELATED APPLICATIONS

This application is a continuation of U.S. patent application Ser. No. 15/945,960 filed Apr. 5, 2018, which is a continuation of co-pending U.S. patent application Ser. No. 15/337,133 filed Oct. 28, 2016, which issued on Sep. 18, 2018 as U.S. Pat. No. 10,076,822, which claims the benefit of priority under 35 U.S.C. § 119(e) to U.S. Provisional Patent Application No. 62/254,051, filed Nov. 11, 2015. The disclosure set forth in the referenced application is incorporated herein by reference in its entirety.

BACKGROUND OF THE INVENTION

This invention relates generally to a method for media blasting and finishing a gear or other workpiece or part and cleaning the workpiece thereafter. The powered part hold-down apparatus of U.S. Pat. No. 5,272,897 may be used for the peening step(s) of the present disclosure, and the disclosure of the U.S. Pat. No. 5,272,897 patent is hereby incorporated in its entirety by this reference. Elements of other known methods of media blasting and finishing, such as the peen finishing method and apparatus of U.S. Pat. No. 8,453,305, may be used for the present disclosure, and the disclosure of the U.S. Pat. No. 8,453,305 patent is hereby incorporated in its entirety by this reference.

Media blasting or peening is used to increase the fatigue strength of a gear, workpiece or part. Gears, such as those utilized in automobile transmissions are media blasted to increase their surface durability and ensure that they are suitable for performing their intended functions. As an example, media blasting with steel peening may be used for strengthening the root radius of the teeth of a geared workpiece. The media blasting steps of the present invention includes the steps disclosed in U.S. Pat. No. 6,612,909 and the disclosure of the U.S. Pat. No. 6,612,909 patent is hereby incorporated in its entirety by reference.

When media blasting a workpiece, such as a gear, the workpiece is placed in a closed chamber and the blasting system is actuated, whereby media are mixed with air. After mixing of the media and air, a stream of the air/media mixture is directed against the workpiece, often through increased or high-speed application. This process is referred to as peening. The peening process is configured to affect and change the characteristics of the surface of the workpiece, and in particular increase the strength of the workpiece. Accordingly, media blasting a workpiece improves the durability of a workpiece.

Due to the force/speed of the peening process, as well as the size and characteristics of the peening media, peening material or particles of peening material that have broken off from peening material may be retained or lodged on the surface of the workpiece after the peening process has occurred. This may be especially true for gears or other workpieces that have teeth or grooves, as the peening material may be retained within recesses or grooves of the workpiece. Alternatively or additionally, particles from the part being processed by break off and be retained or lodged on the surface of the workpiece. Such particles may be very small or microscopic in size, depending on the original size of the media, the force at which the media is blasted, the hardness of the surface of the workpiece, etc. A variety of materials/media may be used for media blasting the workpiece, depending on the ultimate application or outcome desired by the workpiece.

In automotive application, it is often desired to increase the strength or hardness of the surface of the workpiece in order to have more favorable KSI. In the present disclosure toughness is discussed in terms of "KSI" (kilo-pound[-force] per square inch) or 1000 psi. KSI is often used in materials science, civil and mechanical engineering to specify stress and Young's modulus. A higher KSI is favorable for materials that will be under larger compressive stresses. When a workpiece, in particular a workpiece made of media that has a high KSI, is peened, the peening material is blasted against the surface of the workpiece, removing and modifying the microscopic landscape of the surface. Due to the nature of the peening process, material that has been removed or blasted from the surface of the workpiece may be retained on the workpiece after the peening process has occurred.

It is advantageous to have a workpiece with a smooth surface without particles, media, or debris on or lodged into the surface when a workpiece or part is utilized in its final application/configuration. Accordingly, it is known to clean the workpiece after a peening process, for example, through a spray and wash unit. However, given the microscopic size of the particles, the force at which the peening material is blasted, and the shape and size of the workpieces being processed, traditional forms and processes of cleaning may not remove all particles or material from the surface of the workpiece.

This background information is provided to offer some information believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

OBJECTS AND SUMMARY OF THE INVENTION

An object of the present invention is to remove or reduce particulates or particles on the surface of a workpiece that has been subjected to a peening process. In illustrative embodiments, the workpiece is subjected to a multi-step cleaning process after it has been processed/peened. The peening step(s) toughen the gears and provide roughness to the gear surfaces. The multi-step cleaning process after peening removes or reduces the particles or particulates that remain on the surface of the workpiece after processing.

Another object of the present invention is to provide a cleaning process wherein a cleaning apparatus includes at least a first spray-and-wash unit, a first ultrasonic wash unit, a second ultrasonic wash unit, and a second spray-and-wash unit. The cleaning apparatus includes these units in the order listed. A part that has been exposed to the media blasting process is then transferred to the cleaning apparatus to be cleaned and to prepare the surface of the part for its ultimate use/function. The first and second spray-and-wash units may utilize heated water that has been filtered. The first and second ultrasonic wash units may utilize heated water and a rust inhibitor to ultrasonically clean the part in a wash bath or basin full of water. The ultrasonic units are configured to vibrate the water in the wash bath at a specific frequency.

The first ultrasonic wash unit is operated at a first frequency and the second ultrasonic wash unit is operated at a second frequency, wherein the first frequency and second frequency are different from each other.

These and other advantages and features will become more apparent from the following description taken in conjunction with the drawings.

BRIEF DESCRIPTION OF THE DRAWINGS

The present invention will not be described, by way of example, with reference to the accompanying drawings in which.

FIG. 3 is a top plan view of the media blasting apparatus of FIG. 1;

FIG. 4 is an enlarged, partial fragmentary, side elevational view of a blast station of an exemplary media-blasting apparatus for treating a workpiece in the processing-and-cleaning process according to the present disclosure;

DETAILED DESCRIPTION OF PREFERRED EMBODIMENTS

Figure 5:
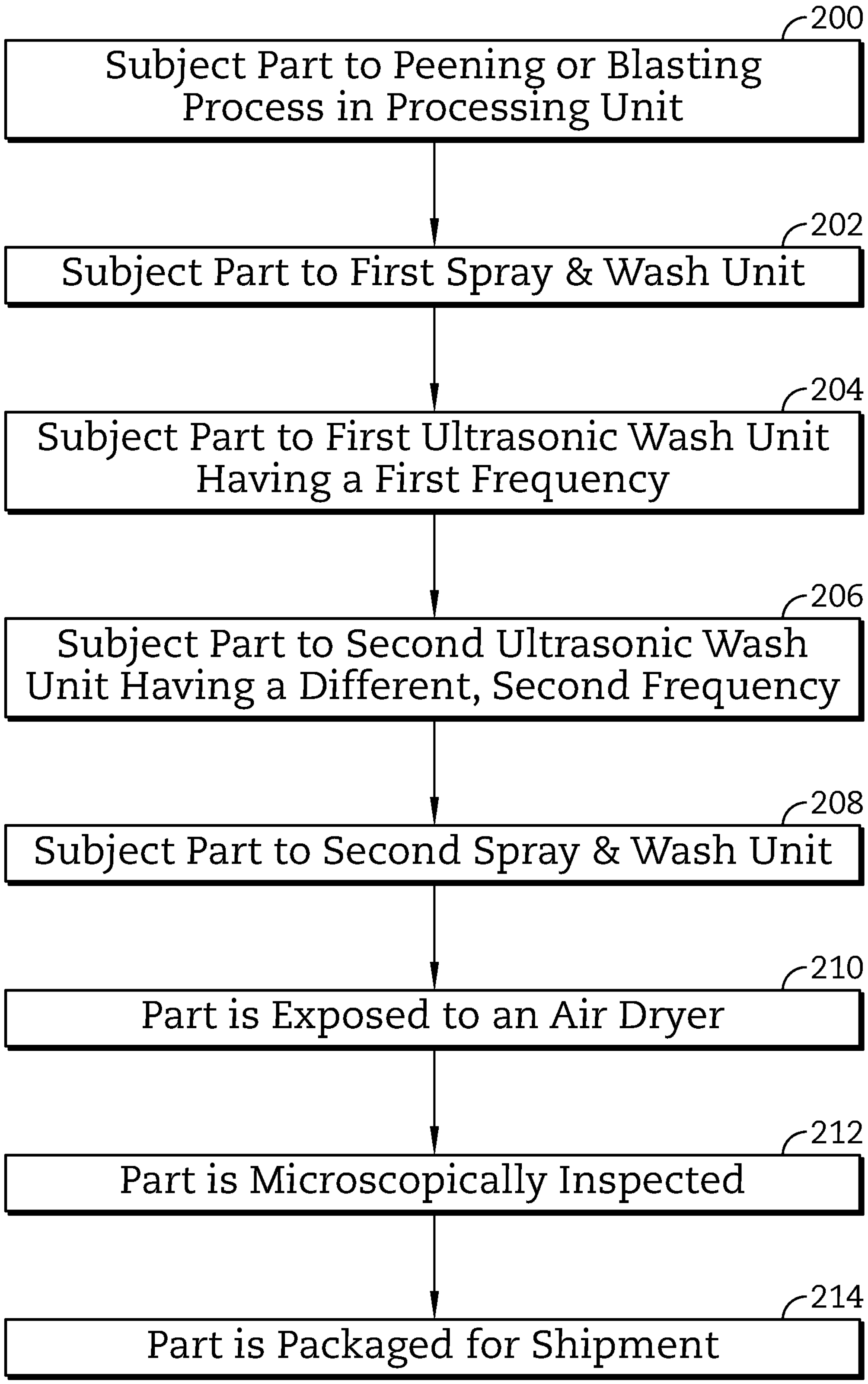
FIG. 5 is a flow chart for a processing and cleaning process of the present disclosure.
Figure 6:
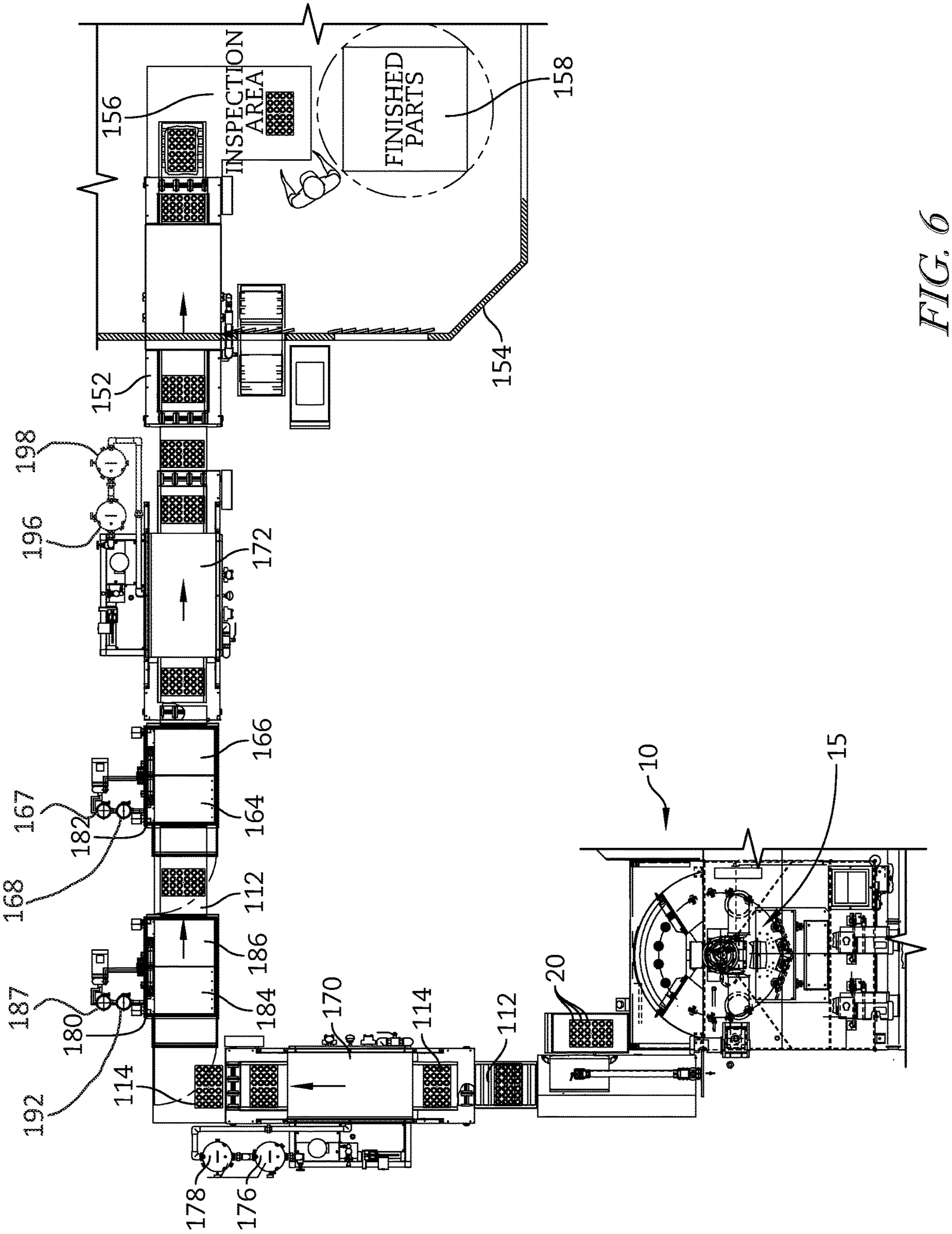
FIG. 6 is a top view of an exemplary embodiment of the components of the processing and cleaning process of the present disclosure, illustrating the process includes a media-blasting apparatus and a cleaning apparatus.
Figure 7:
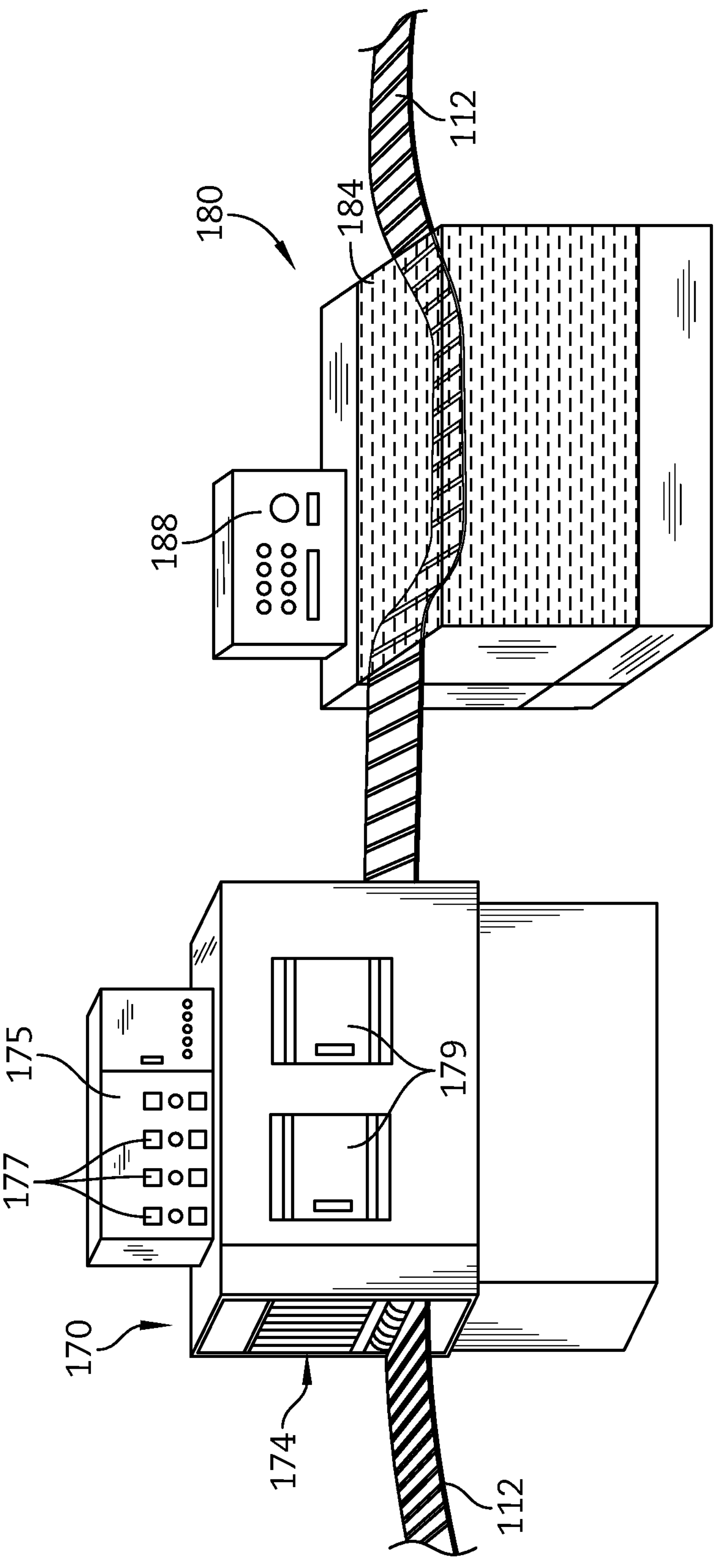
FIG. 7 is a side schematic of an exemplary embodiment of a first wash and spray unit and a first ultrasonic wash unit of the cleaning apparatus of the present disclosure.
Figure 8:
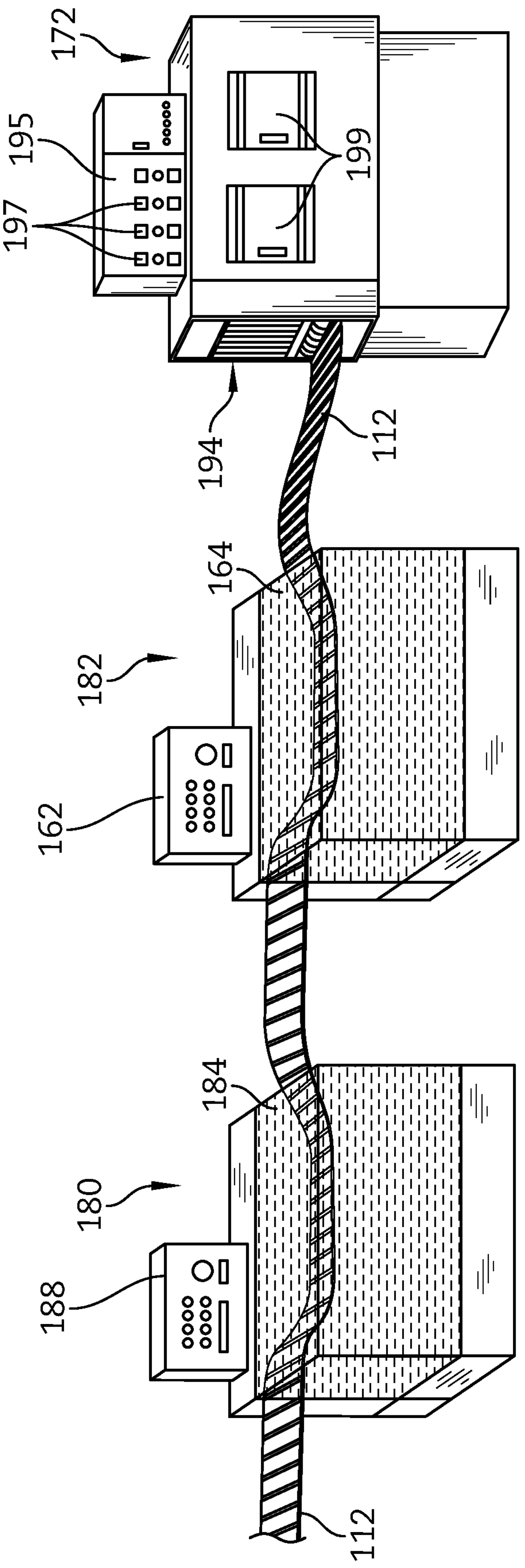
FIG. 8 is a side schematic of an exemplary embodiment of a first ultrasonic wash unit, a second ultrasonic wash unit, and a second wash-and-spray unit of the present disclosure.

Referring now to the drawings, FIGS. 1-4 illustrate a media blasting apparatus according to the invention, generally indicated by the number 10. FIG. 5 illustrates a flow diagram for a part processing-and-cleaning process accordingly to the invention. FIG. 6 illustrates an exemplary flow layout of a media blasting apparatus and a cleaning apparatus of the present disclosure. FIGS. 7 and 8 illustrate components of the cleaning apparatus of the present disclosure.

The media blasting apparatus 10 will now be described. As illustrated in FIGS. 1-4, the media blasting apparatus 10 includes a blasting cabinet or chamber 15, in which a stream of media is directed against a workpiece 20. Such media may comprise, for example, cut wire, glass beads, ceramic beads or fine steel beads. As the media engages with the surface of the workpiece, microscopic or small particles from the media may be retained or lodged into the surface of the workpiece due to the force and direction of the blasting stream. Further, the cabinet 15 is connected to a cabinet media hopper 25 for collecting the media that fall after collision with the workpiece 20. The fallen media will include broken pieces of media which have been recycled, as well as virgin or unbroken pieces. Media of sufficient size is reclaimed in this system, as discussed below, and mixed with virgin media to be reused in the blasting operation. Accordingly, it is understood that the media may have slight variations in size and dimension as it is blasted against the surface of the workpiece. Such slight variations may further encourage some of the media or particles of the media to be retained or lodged into the surface of the workpiece.

Figure 2:
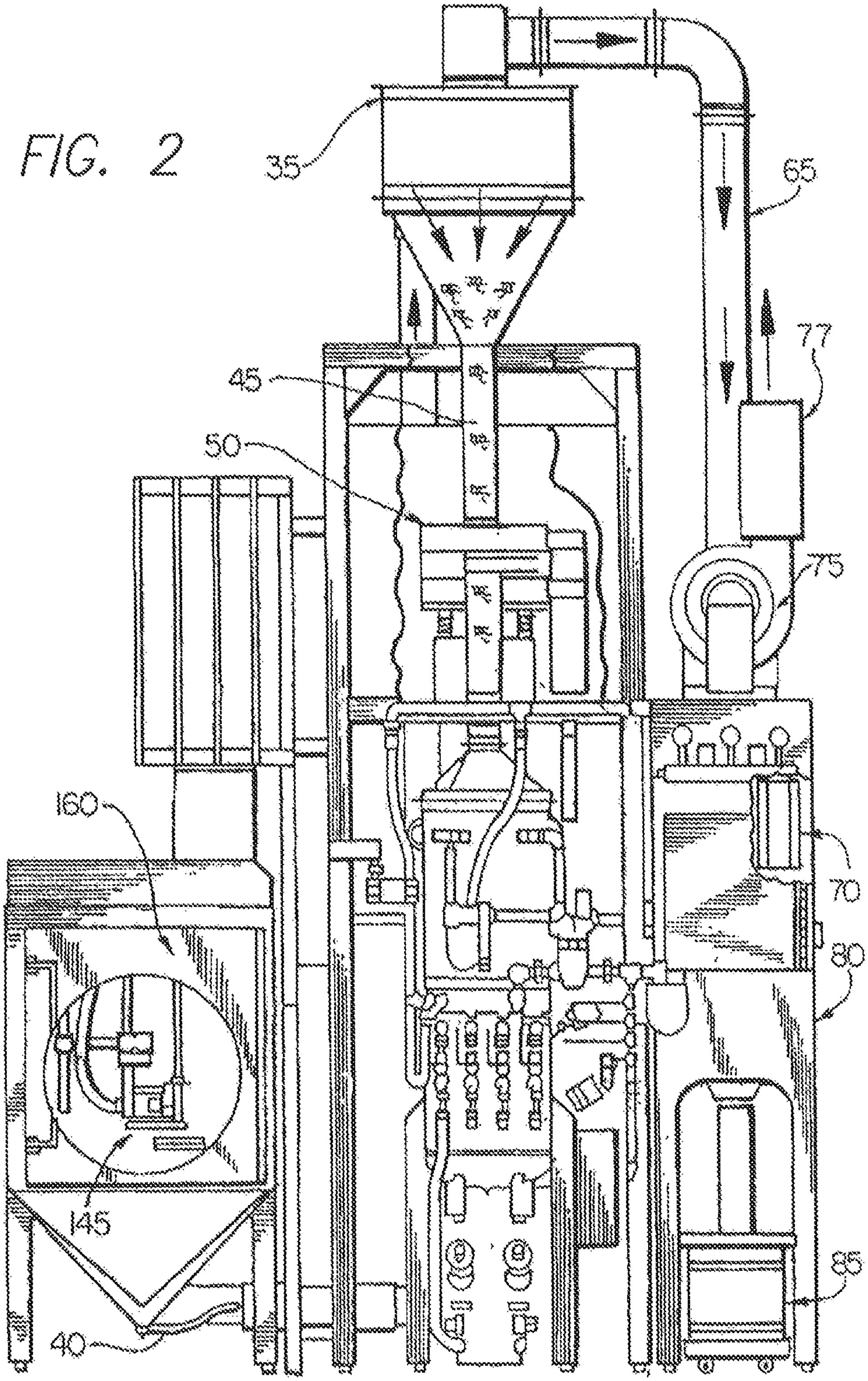
FIG. 2 is a right-side elevational view of the media blasting apparatus of FIG. 1.

A conduit 30 connects the cabinet media hopper 25 to a media reclaim system, generally indicated by the number 35. As best illustrated in FIG. 2, the cabinet media hopper 25 is also connected to air supply means 40. The air supply means 40 provides air flow to the cabinet media hopper 25, for forcing the collected fallen media up through the conduit 30 to the media reclaim system 35. As the media engages with the surface of the workpiece, microscopic or small particles from the media may be retained or lodged into the surface of the workpiece due to the force and direction of the blasting stream.

Figure 1:
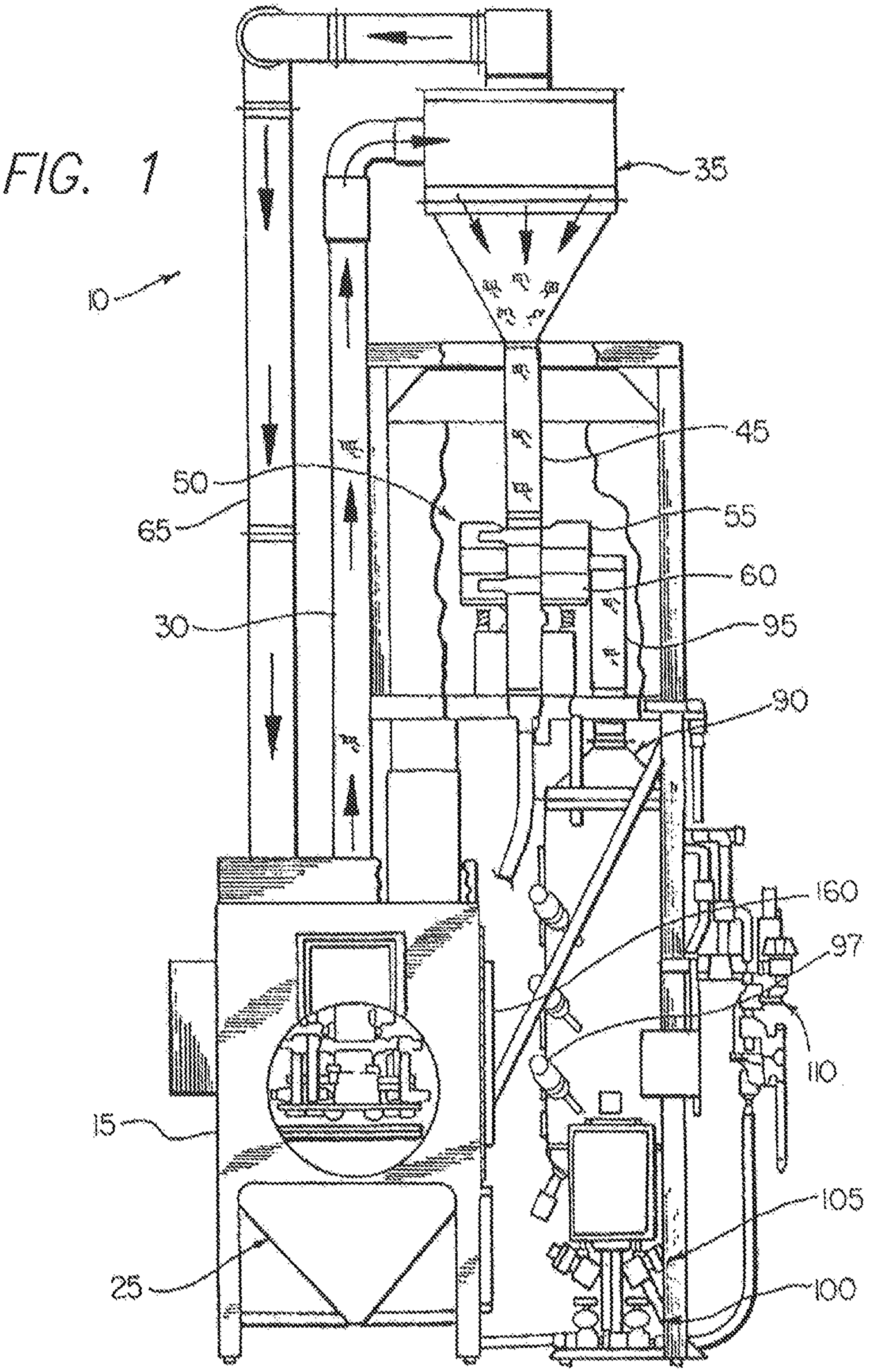
FIG. 1 is a front elevational view of an exemplary media blasting apparatus for treating a workpiece according to the media-blasting process of the processing-and-cleaning process of the present disclosure.

As illustrated in FIGS. 1 and 2, the media reclaim system 35 includes a conduit 45 for conveying collected media to separation means 50. In illustrative embodiments, the separation means 50 may be a two-deck system comprising a top screen 55 and a bottom screen 60. In a preferred embodiment of the present invention, the top screen is between 20 and 40 mesh gauge and the bottom screen is between 170-200 mesh gauge. The separation means 50 generally separates the fallen media into unbroken media and broken media of sufficiently large size to be recycled for use in the first blasting operation and fines or dust which cannot be reused in the media blasting apparatus 10. The separator screens 55 and 60 are constantly vibrated to increase the efficiency of separation.

As illustrated in FIG. 1, the separation means 50 of the media blasting apparatus 10 may be connected to a double pressure chamber 90 via a conduit 95. A media path may be defined between the cabinet media hopper 25 and the pressure chamber 90. In a preferred embodiment, the double pressure chamber is held between 70 and 80 psi. The conduit 95 delivers the reclaimed reusable media to the double pressure chamber 90 where the reclaimed and reusable media are mixed with virgin media. In a preferred embodiment, the reclaimed media are of a mesh size greater than 100 mesh and the virgin media are of a mesh size between 60-100 mesh and preferably between 60-80 mesh. As stated previously, in the present invention, the media of the first medial blasting apparatus 10 may comprise glass, ceramic, or fine steel beads. The virgin media are supplied to the double pressure chamber 90 through a plurality of media supply valves 97. The double pressure chamber 90 is also coupled to a media sensor monitor 100 for automatically controlling the supply of the virgin media. The supply of the virgin media is controlled to ensure adequate peening of the workpiece. Specifically, the supply of the virgin media is controlled to ensure that adequate compression stress is provided to the workpiece 20 so that a sufficiently high fatigue strength is obtained upon blasting. The double pressure chamber 90 may further include a media metering on/off valve 105.

An exemplary blasting station 120 inside the blasting cabinet 15 of the media blasting apparatus 10 will now be described. As illustrated in FIG. 4, the workpiece 20 to be processed, i.e., blasted with media, is mounted on a part holder 125. Preferably, the part holder 125 has been hardened. In illustrative embodiments, the workpiece 20 is held in a predetermined position by a powered part hold-down apparatus 130. In the present invention, the powered part-hold-down apparatus 130 is preferably that described in U.S. Pat. No. 5,272,897, to which reference is again invited. The subject matter of U.S. Pat. No. 5,272,897 is incorporated herein by reference. The patented powered part-hold-down apparatus 130 provides variable, compensating, cushioned clamping for maintaining the workpiece 20 in the predetermined position during media blasting. The device as taught in U.S. Pat. No. 5,272,897 is very important to facilitate processing high volume quantities of parts. This is especially important for parts such as gears that tend to rotate when peened since the hold-down device prevents free spinning of the parts. The hold-down device also controllably rotates the parts at a desired rate of rotation. Rotation of the powered part-hold-down apparatus 130 is provided via a rotatable shaft 135.

In illustrative embodiments, hardened rods 140, preferably steel, provide a support system for a gun-rack assembly 145 of the blasting station 120. As illustrated in FIG. 4, the gun-rack assembly 145 holds a nozzle holder 150. A blast nozzle 155, to which the blasting hoses 115 are connected, is attached to the nozzle holder 150. The blast nozzle 155 directs a stream of media, suspended in air, against the surface of the workpiece 20. Preferably, the blast nozzle is positioned between approximately four to eight inches away from the workpiece 20. Although only one blast nozzle 155 is illustrated in FIG. 4, it will be understood to those skilled in the art that a plurality of blast nozzles 155 could be used. In a preferred embodiment of the present invention, four such blast nozzles 155 are located in the blasting cabinet 15, as shown in FIG. 3. The blasting cabinet 15, containing the part-hold-down apparatus 130 and blasting apparatus 120 is also provided with a door 160 for installation of a new workpiece.

Operation of the media blasting device 10 will now be described. After a workpiece 20 is placed in the part-hold-down apparatus 130, door 160 is closed. A stream of media suspended in air is then directed against the workpiece 20 by the blast nozzle 155. As the media are blasted, the workpiece is controllably rotated by the powered patented part-hold-down apparatus 130. This controlled rotation ensures even peening of the surface of the workpiece 20 and obviates use of a high directivity stream of media, hence making the use of water-supported media unnecessary, allowing for the media to be streamed via an air-media mixture as discussed above. As the stream of media is blasted against the surface of the workpiece, particles of the media may be retained on or lodged into the surface of the workpiece due to the force and direction of the media stream.

The powered part-hold-down apparatus 130 is preferably rotated at between 8-12 rpm. A rate of rotation of 10-12 rpm, however, has been found to be particularly effective for treatment of gears. The rate of rotation can be related to the degree of peening required and to the evenness of dimpling on the resulting surface. A slow controlled rotation permits even peening with uniform small dimpling and prevents the media stream from striking the surface unevenly, resulting in indentations that could act as crack precursors. Thus, for example, if the workpiece 20 is a gear, the controlled rotation ensures that media, e.g. cut wire, ceramic beads, fine steel beads, or glass beads, are directed towards the root and tooth face of the gear during the course of the rotation. By ensuring even peening, the operational characteristics of the workpiece 20 are improved.

In one embodiment a smaller mass flowrate of media is blasted at higher velocity and for a longer time than in the prior art methods. The preferred flowrate depends on the type and size of media used, as well as the particular application involved. For treatment of gears, it has been found that a media flowrate of approximately 1.5-3 lb/minute to be effective. Of course, other flowrates could be used, depending on the results desired. This flowrate was found to be effective with glass media, ceramic media, and fine steel media of mesh size falling in the range of 50-100 mesh. In a preferred embodiment of the present invention, however, 60-100 mesh glass media are used. When 60-100 mesh glass media were used to treat certain gears, including those made using 8620 steel or other material with a high KSI, a marked improvement in the operational characteristics of such gears was observed. The choice of media to be used depends upon the application and the relative economics. Ceramic and steel media last longer than glass; however, these media are more expensive. As with the rate or rotation, the flowrate and media used may be configured to ensure even peening of the workpiece.

The cleaning apparatus 110 of the present disclosure will now be described. As illustrated in FIG. 6, the cleaning apparatus 110 may be positioned adjacent to the media blasting apparatus 10 to receive parts 20 after they have been processed in the media blasting apparatus 10. In illustrative embodiments, a conveyor belt 112 or similar conveying device may be used to transport a part 20 from the media blasting apparatus 10 to the cleaning apparatus 110 and/or through the cleaning apparatus 110. In illustrative embodiments, multiple parts 20 may be transported to and through the cleaning apparatus 110 in a conveying container 114, and the parts 20 may travel to and through the cleaning apparatus 110 within the conveying container 114. Other means and modes of transporting parts 20 are generally known in the art.

In illustrative embodiments, the cleaning apparatus 110 includes, for example, a first spray-and-wash unit 170, a first ultrasonic wash unit 180, a second ultrasonic wash unit 182, and a second spray-and-wash unit 172, as illustrated in FIGS. 5-6. During the cleaning process, the part 20 may be cleaned in the first spray-and-wash unit 170 after being processed in the media blasting apparatus 10. The first spray-and-wash unit 170 may be configured to spray heated liquid or water on the part 20 as it travels through a cavity 174 of the first spray-and-wash unit 170 in order to remove particles from the surface of the part 20. In illustrative embodiments, the liquid may be prepared through a filter 176 and a cartridge 178 of the first spray-and-wash unit 170 before it is sprayed onto the part 20. In other embodiments, the filter 176 and cartridge 178 may be separate from the spray-and-wash unit 170. As the part 20 is being cleaned in the first spray-and-wash unit 170, the part may be monitored via one or more windows or doors 179 of the first spray-and-wash unit 170. The doors 179 may permit access to the part 20 during cleaning. The first spray-and-wash unit 170 may include means to rotate the part 20, such as a turntable or other structure (not shown), within the cavity 174. A control panel 175 of the first spray-and-wash unit 170 may permit control of the temperature of the heated liquid sprayed on the part 20, the length of time the part 20 is within the cavity 174, the speed or rotational movement of the part 20 within the cavity, or other variables of the first spray-and-wash unit 170. The control panel 175 may also include indicators 177 that identify whether the first spray-and wash unit 170 is operating within selected criteria, the operation and useful life of the filter 176 or cartridge 178, etc.

In illustrative embodiments, after the part 20 is cleaned in the first spray-and-wash unit 170, it is transported to the first ultrasonic wash unit 180. The first ultrasonic wash unit 180 includes at least a wash basin 184 to receive the part 20. In illustrative embodiments, the container 114 may be configured to be received within the wash basin 184 and/or a basket (not shown) may be used to retain part 20 within the wash basin 184. The wash basin 184 is configured to receive heated liquid or water, and the first ultrasonic wash unit 180 further includes means for ultrasonically vibrating the liquid within the wash basin 184 at a frequency F1. The part 20 may be full submerged within the liquid of the wash basin 184 during operation of the first ultrasonic wash unit 180. The ultrasonic vibration of the liquid adjacent the part 20 while the part 20 is within the wash basin 184 is configured to further remove or reduce undesired particulates or particles on the surface of the part 20. The ultrasonic wash unit 180 may further includes a rinsing apparatus 186 that further rinses a part 20 with liquid after it has been cleaned in the wash basin 184. The ultrasonic wash unit 180 may further include a control panel 188 to permit control or monitoring of the temperature of the heated liquid in the wash basin 184 or rinsing apparatus 186, the frequency F1 of vibration of the liquid in the wash basin 184, the length of time the part 20 is within the wash basin 184 or the rinsing apparatus 186, the speed of the part 20 as it travels through the first ultrasonic wash unit 180, or other variables of the first ultrasonic was unit 170. In illustrative embodiments, the liquid of the wash basin 184 or the rinsing apparatus 186 may be prepared through a filter 187 and a cartridge 192 of the first ultrasonic wash unit 180 before the part 20 is exposed to the liquid. In illustrative embodiments, liquid in the rinsing apparatus 186 or wash basin 184 may further include a rust inhibitor agent or other chemicals to improve the characteristics of the part 20.

In illustrative embodiments, after the part 20 is cleaned in the first ultrasonic wash unit 180, it is transported to the second ultrasonic wash unit 182. The second ultrasonic wash unit 182 includes at least a wash basin 164 to receive the part 20. In illustrative embodiments, the container 114 may be configured to be received within the wash basin 164 and/or a basket (not shown) may be used to retain part 20 within the wash basin 164. The wash basin 164 is configured to receive heated liquid or water, and the second ultrasonic wash unit 182 further includes means for ultrasonically vibrating the liquid within the wash basin 164 at a frequency F2. The part 20 may be fully submerged within the liquid of the wash basin 184 during operation of the second ultrasonic wash unit 182. The ultrasonic vibration of the liquid adjacent the part 20 while the part 20 is within the wash basin 164 is configured to further remove or reduce undesired particulates or particles on the surface of the part 20. The ultrasonic wash unit 182 may further includes a rinsing apparatus 166 that further rinses a part 20 with liquid after it has been cleaned in the wash basin 164. The ultrasonic wash unit 182 may further include a control panel 162 to permit control of the temperature of the heated liquid in the wash basin 164 or rinsing apparatus 166, the frequency F2 of vibration of the liquid in the wash basin 164, the length of time the part 20 is within the wash basin 164 or the rinsing apparatus 166, the speed of the part 20 as it travels through the second ultrasonic wash unit 182, or other variables of the second ultrasonic was unit 172. In illustrative embodiments, the liquid of the wash basin 164 or the rinsing apparatus 166 may be prepared through a filter 167 and a cartridge 168 of the second ultrasonic wash unit 182 before the part 20 is exposed to the liquid. In illustrative embodiments, liquid in the rinsing apparatus 166 or wash basin 164 may further include a rust inhibitor agent or other chemicals to improve the characteristics of the part 20.

In illustrative embodiments, the first ultrasonic wash unit 180 may be similar in operation to the second ultrasonic wash unit 182, as noted above. In other embodiments, the first ultrasonic wash unit 180 may only comprise a wash basin 184 without a rinsing apparatus 186, and the part 20 may only be submerged in a liquid of the wash basin 184 while being processed in the first ultrasonic wash unit 180. Further, the second ultrasonic wash unit 182 may only comprise a rinsing apparatus 166 without a wash basin 164, and the part 20 may only be submerged in a liquid of the rinsing apparatus 166 while being processed in the second ultrasonic wash unit 182. Other features or alternatives of the first and second washing units 180 and 182 are envisioned within the scope of this disclosure.

In illustrative embodiments, ultrasonic wash units 180 and 182 may configured to operate at multiple frequencies, includes frequencies F1 and F2, which can be controlled via controllers 188 and 162. In illustrative embodiments, the frequency F1 of the first ultrasonic wash unit 180 is configured to be different from the frequency F2 of the second ultrasonic wash unit 182. By processing a media-blasted part through a chain of ultrasonic wash units 180 and 182 that operate a different frequencies, more efficient and effective removal of additional or hard-to-remove particulates or particles from the surface of the part 20 being processed can be achieved. For example, processing the part 20 in the ultrasonic wash unit 180 that operates at frequency F1 may remove certain particles, e.g. a first set of particles, from the surface of the part 20, and then processing the part 20 in the ultrasonic wash unit 182 that is operating at a different frequency F2 may remove additional particles from the surface of the part 20 that were unable to be removed by the first ultrasonic wash unit 180. The amount of difference between the frequencies F1 and F2 can be modified or altered depending on the type of material of the part, the shape of the part, the type of peening that occurred, the peening material, etc., in order to achieve a desired or optimal particle removal rate. In various embodiments, the first frequency F1 may be approximately 25 kHz and the second frequency F2 may be approximately 40 kHz. However, other frequencies are envisioned herein for the two frequencies F1 and F2.

After the part 20 is processed in the second ultrasonic wash unit 182, the part 20 may be cleaned again in the second spray-and-wash unit 172. The second spray-and-wash unit 172 may be configured similar to the first spray-and-wash unit 170. Specifically, the second spray-and wash unit 172 may be configured to spray heated liquid or water on the part 20 as it travels through a cavity 194 of the second spray-and-wash unit 172 in order to remove particles from the surface of the part 20. In illustrative embodiments, the liquid may be prepared through a filter 196 and a cartridge 198 of the second spray-and-wash unit 172 before it is sprayed onto the part 20. In other embodiments, the filter 196 and cartridge 198 may be separate from the spray-and-wash unit 172. As the part 20 is being cleaned in the second spray-and-wash unit 172, the part may be monitored via one or more windows or doors 199 of the spray-and-wash unit 172. The doors 199 may permit access to the part 20 during cleaning. The second spray-and-wash unit 172 may be include means to rotate the part 20, such as a turntable or other structure (not shown), within the cavity 194. A control panel 195 of the spray-and-wash unit 172 may permit control of the temperature of the heated liquid sprayed on the part 20, the length of time the part 20 is within the cavity 194, the speed or rotational movement of the part 20 within the cavity 194, or other variables of the second spray-and-wash unit 172. The control panel 195 may also include indicators 197 that identify whether the second spray-and wash unit 172 is operating within selected criteria, the operation and useful life of the filter 196 or cartridge 198, etc.

In illustrative embodiments, after the part 20 is processed in the second spray and-wash unit 172, the part 20 may be transported to a drying unit 152 where the part 20 is dried. In illustrative embodiments, the drying unit 152 may be a heated air dryer conveyor. The part 20 may then be transported into a pressurized room 154 where a conditioned air system filters air and provides positive pressure into the room 154. The part may be transported to an inspection area 156 inside the pressurized room 154 for microscopic inspection of the part 20 to insure that no additional or undesired particles or particulates remain on the surface of the part 20. The part may then be collected in a finished parts region 158 of the pressurized room 154 for packaging for transportation.

With the background understanding of the media blasting apparatus 10 and cleaning apparatus 110, an illustrative embodiment of the part processing-and-cleaning process accordingly to the present disclosure will now be described. As illustrated in FIG. 5, a part is subjected to a peening or blasting process in the processing unit 10, as described above, in step 200. The part is then removed from the processing unit 10 and cleaned in a first spray-and-wash unit 170 in step 202. Next, the part is cleaned in a first ultrasonic wash unit 180 having a first frequency F1 in step 204. The part is then removed from the first ultrasonic wash unit 180 and cleaned in a second ultrasonic wash unit 182 having a second frequency F2 in step 206. The second frequency F2 may be different from the first frequency F1. The part is then moved from the second ultrasonic wash unit 182 and into a second spray-and-wash unit 172. The part is cleaned in the second spray-and-wash unit 172 in step 208. The part is then dried in step 210 and microscopically inspected in step 212. After the part has passed the inspection, the part is packaged for shipment in step 214. Other variations of the part processing-and-cleaning process may be envisioned.

While the method of media blasting and finishing for gears is disclosed herein with respect to a hold down apparatus, it is contemplated that other conventional part holders and blasting apparatus may also be used with the steps described herein. The above discussed process recognizes that most often gears need steel peening at the gear root to prevent fatigue bending in the root radius.

The applicant has provided description and figures that are intended as an illustration of certain embodiments of the invention and are not intended to be construed as containing or implying limitation of the invention to those embodiments. It will be appreciated that, although applicant has described various aspects of the invention with respect to specific embodiments, various alternatives and modifications will be apparent from the present disclosure which are within the spirit and scope of the present invention.

What I claim is:

1. A method of processing a part, the method comprising:
- subjecting a surface of the part to a media blasting process;
- submerging the part in a first liquid in a first wash basin of a first ultrasonic wash unit that is vibrating the first liquid at a first frequency, wherein the first ultrasonic wash unit vibrates only at the first frequency;
- rinsing the part in a first rinser rinsing assembly;
- submerging the part in a second liquid in a second wash basin of a second ultrasonic wash unit that is vibrating the second liquid at a second frequency different than the first frequency, wherein the second ultrasonic wash unit vibrates only at the second frequency; and
- rinsing the part in a second rinser rinsing assembly.

2. The method of claim 1, wherein the first frequency and the second frequency are selected by modifying adjusting at least one of the first frequency and the second frequency, such that a difference between the first frequency and the second frequency achieves a desired particle removal rate from the part.

3. The method of claim 2, wherein the first frequency is 25 kHz and the second frequency is 40 kHz.

4. The method of claim 1, wherein the rinsing the part in the first rinser rinsing assembly and the second rinser rinsing assembly include rinsing the part with a third liquid.

* * * * *